United States Patent
Saito

(10) Patent No.: US 10,686,325 B2
(45) Date of Patent: Jun. 16, 2020

(54) BATTERY MODULE INCLUDING ONE OR MORE BATTERY CELLS CONNECTED IN SERIES AND BATTERY DEVICE INCLUDING SAME

(71) Applicant: MURATA MANUFACTURING CO., LTD., Kyoto (JP)

(72) Inventor: Keisuke Saito, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 99 days.

(21) Appl. No.: 16/144,068

(22) Filed: Sep. 27, 2018

(65) Prior Publication Data

US 2019/0027952 A1 Jan. 24, 2019

Related U.S. Application Data

(63) Continuation of application No. PCT/JP2017/006325, filed on Feb. 21, 2017.

(30) Foreign Application Priority Data

Apr. 8, 2016 (JP) ................................. 2016-077751

(51) Int. Cl.
*H01M 10/46* (2006.01)
*H02J 7/00* (2006.01)
(Continued)

(52) U.S. Cl.
CPC .......... *H02J 7/0072* (2013.01); *B60L 3/0046* (2013.01); *B60L 53/20* (2019.02); *B60L 58/10* (2019.02);
(Continued)

(58) Field of Classification Search
USPC ........................ 320/112, 116, 127, 135, 136
See application file for complete search history.

(56) References Cited

U.S. PATENT DOCUMENTS

| | | | |
|---|---|---|---|
| 5,872,445 | A | 2/1999 | Ozawa et al. |
| 2012/0217813 | A1 | 8/2012 | Takeuchi |

(Continued)

FOREIGN PATENT DOCUMENTS

| | | |
|---|---|---|
| JP | 8-84440 | 3/1996 |
| JP | H08-84440 A | 3/1996 |

(Continued)

OTHER PUBLICATIONS

Japanese Office Action dated Jun. 18, 2019 in corresponding Japanese Application No. 2018-510257.

(Continued)

*Primary Examiner* — Edward Tso
(74) *Attorney, Agent, or Firm* — K&L Gates LLP

(57) ABSTRACT

Provided is a battery module including a battery part including one battery cell or a plurality of battery cells connected in series, first and second leads respectively led out from a positive electrode and a negative electrode of the battery part, a first FET in which the first FET is an N-channel type and a drain of the first FET is connected to the first lead and a source of the first FET is connected to a positive output terminal, a negative output terminal connected to the second lead, a pre-discharge circuit provided in parallel with a drain-source path of the first FET and is configured to raise a potential of the positive output terminal prior to an ON state of the first FET at discharging, and a forced OFF circuit configured to turn off the first FET by short-circuiting between a gate and the source of the first FET.

19 Claims, 9 Drawing Sheets

(51) Int. Cl.
*H01M 10/44* (2006.01)
*H01M 10/48* (2006.01)
*B60L 3/00* (2019.01)
*B60L 58/21* (2019.01)
*H02J 7/02* (2016.01)
*B60L 53/20* (2019.01)
*B60L 58/10* (2019.01)
*H01M 10/42* (2006.01)

(52) U.S. Cl.
CPC ........... *B60L 58/21* (2019.02); *H01M 10/425* (2013.01); *H01M 10/44* (2013.01); *H01M 10/48* (2013.01); *H02J 7/0021* (2013.01); *H02J 7/0026* (2013.01); *H02J 7/0027* (2013.01); *H02J 7/0031* (2013.01); *H02J 7/0068* (2013.01); *H02J 7/027* (2013.01); *B60L 2240/547* (2013.01); *B60L 2240/549* (2013.01); *H01M 2010/4271* (2013.01); *H02J 7/00304* (2020.01)

(56) References Cited

U.S. PATENT DOCUMENTS

2013/0320927 A1    12/2013   Kumagai
2016/0268816 A1*    9/2016   Mao .................... H02J 7/0013

FOREIGN PATENT DOCUMENTS

| JP | 2000-166108 A | 6/2000 |
| JP | 2011-239633 A | 11/2011 |
| JP | 2012-178936 A | 9/2012 |
| JP | 2013-252002 A | 12/2013 |

OTHER PUBLICATIONS

International Search Report and Written Opinion issued in connection with International Patent Application No. PCT/JP2017/006325, dated May 16, 2017. (8 pages).

* cited by examiner

BATTERY MODULE INCLUDING ONE OR MORE BATTERY CELLS CONNECTED IN SERIES AND BATTERY DEVICE INCLUDING SAME

CROSS REFERENCE TO RELATED APPLICATIONS

The present application is a continuation of PCT patent application no. PCT/JP2017/006325, filed on Feb. 21, 2017, which claims priority to Japanese patent application no. JP2016-077751 filed on Apr. 8, 2016, the entire contents of which are being incorporated herein by reference.

BACKGROUND

The present technology generally relates to a battery module and a battery device using, for example, a lithium ion secondary battery.

A battery module in which a plurality of unit cells (also referred to as battery cells) are connected in series is known. As a unit cell, for example, a lithium ion secondary battery is used. Furthermore, if the battery modules can be connected in series, the output voltage can be increased.

The battery module is one which outputs a predetermined DC voltage. In the configuration in which a voltage of the battery part formed by connecting the unit cells in series always appears at an output terminal, since there is a danger of electric shock or short circuit, a load switch is inserted between the battery part and the output terminal. When a mechanical switch such as a relay or a tact switch is used as a load switch, reliability concerns such as contact deterioration and mechanical failure are present. For this reason, an FET (Field Effect Transistor) is used as a load switch.

SUMMARY

The present technology generally relates to a battery module and a battery device using, for example, a lithium ion secondary battery.

The output voltage of one battery module is set to a predetermined value. It is convenient if it is possible to connect a plurality of battery modules in series so that the output voltage matches the intended use. Since the host controller is commonly provided for a plurality of battery modules, there is a problem that the number of series connections of the battery modules cannot be easily changed.

In the case of connecting a plurality of battery modules in series, when a FET is used as a load switch, a problem arises that normal operation cannot be performed. That is, when a P-channel MOS (Metal Oxide Semiconductor) FET is used as a load switch, ON/OFF control can be easily performed. In general, however, the P-channel MOSFET has a large on-resistance as compared with the N-channel MOSFET, so there is a risk of a decrease in discharge capacity due to loss and heat generation of the FET itself.

On the other hand, when the N-channel MOSFET is used as a load switch, if the output is turned off in a configuration in which a plurality of battery modules are connected in series, the output is turned on again when the output voltage drops to or below the voltage of the own module, and the half ON state is maintained at the threshold of ON/OFF, and there is a problem that the FET breaks depending on the load current. Such problems cannot be avoided unless all of the load switches of the battery modules connected in series are turned off at the same time. However, it is almost impossible to turn off the different battery modules at exactly the same timing because there is a communication time lag or the like.

Therefore, the present technology provides a battery module and a battery device which are adapted not to cause such problems at the time when connected in series.

According to an embodiment of the present technology, a battery module is provided. The battery module includes:
a battery part including one battery cell or a plurality of battery cells connected in series;
first and second leads respectively led out from a positive electrode and a negative electrode of the battery part;
a first Field Effect Transistor (FET) where the first FET is an N-channel type and a drain of the first FET is connected to the first lead and a source of the first FET is connected to a positive output terminal;
a negative output terminal connected to the second lead;
a pre-discharge circuit provided in parallel with a drain-source path of the first FET and the pre-discharge circuit is configured to raise a potential of the positive output terminal prior to an ON state of the first FET at discharging; and
a forced OFF circuit configured to turn off the first FET by short-circuiting between a gate and the source of the first FET.

According to another embodiment of the present technology, a battery device is provided. The battery device includes at least two battery modules being connected in series,
in which
at least one of the battery modules includes:
a battery part including one battery cell or a plurality of battery cells connected in series;
first and second leads respectively led out from a positive electrode and a negative electrode of the battery part;
a first Field Effect Transistor (FET), where the first FET is an N-channel type and a drain of the first FET is connected to the first lead and a source of the first FET is connected to a positive output terminal;
a negative output terminal connected to the second lead;
a pre-discharge circuit provided in parallel with a drain-source path of the first FET and the pre-discharge circuit is configured to raise a potential of the positive output terminal prior to an ON state of the first FET at discharging; and
a forced OFF circuit configured to turn off the first FET by short-circuiting between a gate and the source of the first FET.

According to an embodiment of the present technology, an electronic device configured to receive electric power supply from the above-mentioned battery module or battery device.

According to another embodiment of the present technology, an electric vehicle is provided. The electric vehicle includes:
the above-mentioned battery module or battery device;
a converting device configured to receive supply of electric power from the battery module or the battery device and convert the electric power into a driving force of a vehicle; and
a controller configured to perform information processing on vehicle control based on information on the battery.

According to another embodiment of the present technology, an electric storage device is provided. The electric storage device having the above-mentioned battery module or battery device and configured to supply electric power to an electronic device connected to the battery module or the battery device.

According to another embodiment of the present technology, an electric power system is provided. The electric power system is configured to receive electric power supply from the above-mentioned battery module or battery device.

According to at least one embodiment, a plurality of battery modules can be connected in series without the need for an upper controller. In that case, it is possible to operate the FET as the load switch normally. It should be understood that the effects described here are not necessarily limited and other suitable properties relating to the present technology may be realized and as further described.

BRIEF DESCRIPTION OF THE FIGURES

FIG. 8 is a graph illustrating a voltage transition at the time when the battery device is ON.

DETAILED DESCRIPTION

Figure 1:
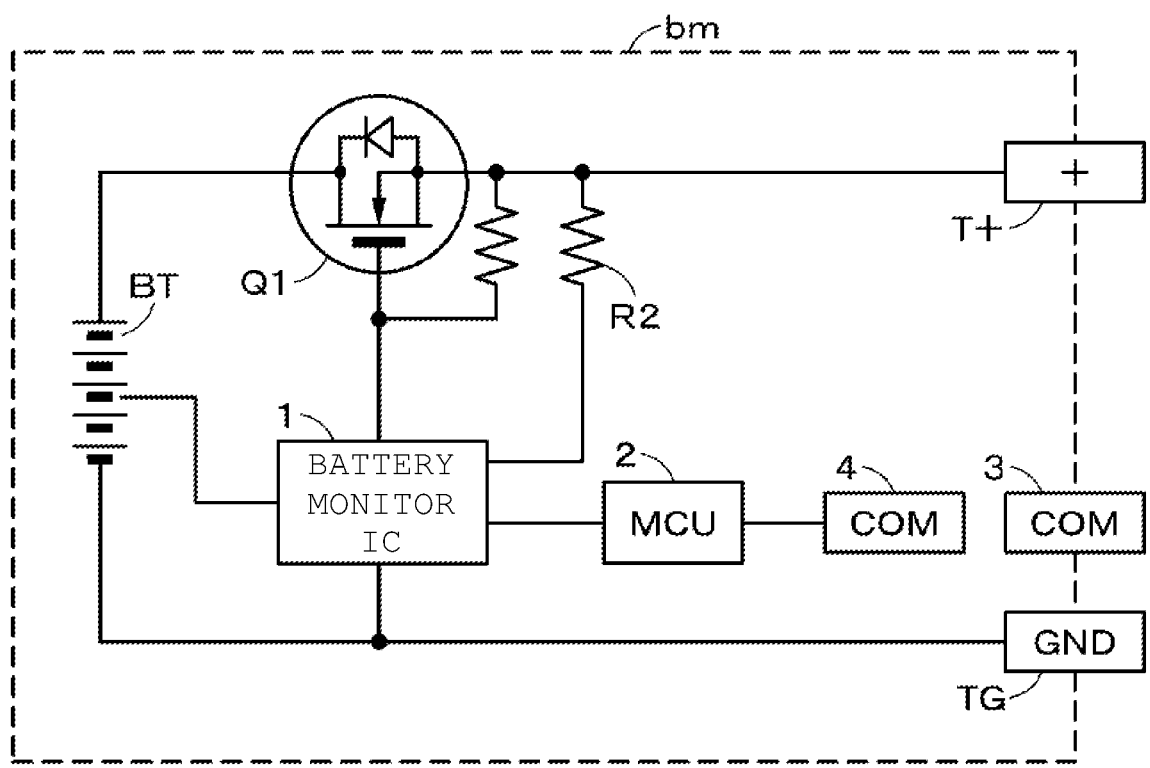
FIG. 1 is a connection diagram of an example of a conventional battery module.

Prior to describing the embodiment of the present technology, the conventional problems will be described. FIG. 1 shows a configuration of a conventional battery module bm. The + side of the battery part BT in which a plurality of battery cells are connected in series is led out as the positive output terminal T+ through the drain-source path of the N-channel MOSFET (Q1). That is, the FET (Q1) is connected to the high side. A power MOSFET capable of a large current is used as the FET (Q1). The negative (−) side of the battery part BT is led out as the negative output terminal TG. The FET (Q1) has the function of a discharge load switch. An N-channel MOSFET is connected between the FET (Q1) and the + side of the battery part BT, as a charge load switch, so that the drain-source path is opposite to that of the FET (Q1), but for simplicity the FET is omitted. The battery part BT is not limited to a configuration in which a plurality of battery cells are connected in series, but may be formed of one battery cell.

The gate of the FET (Q1) is driven by the output of a charge pump of the battery monitor IC1. Since the FET (Q1) is connected to the high side, a high side gate driver is used.

The battery monitor IC1 monitors an individual voltage of each cell of the battery part BT, boosts the boosted voltage by the charge pump, and turns on/off the FET (Q1). There are also cases where the charge pump portion is configured to be independent.

A resistor R2 is connected between the source of the FET (Q1) and the battery monitor IC1. The resistor R2 is a resistor for generating the reference potential (source voltage) for the battery monitor IC1 to turn on the FET (Q1) by the charge pump. Further, the resistor R2 is provided for monitoring the output voltage.

An MCU (microcontroller unit) 2 is connected to the battery monitor IC1. The MCU2 receives an ON/OFF signal of discharge request (FET (Q1) from the load through the communication terminals (COM) 3 and (COM) 4 to the MCU2 and controls the FET (Q1) through the battery IC1. The communication terminals 3 and 4 are insulated. For example, a photocoupler or the like is used as the communication terminals 3 and 4.

Figure 2:
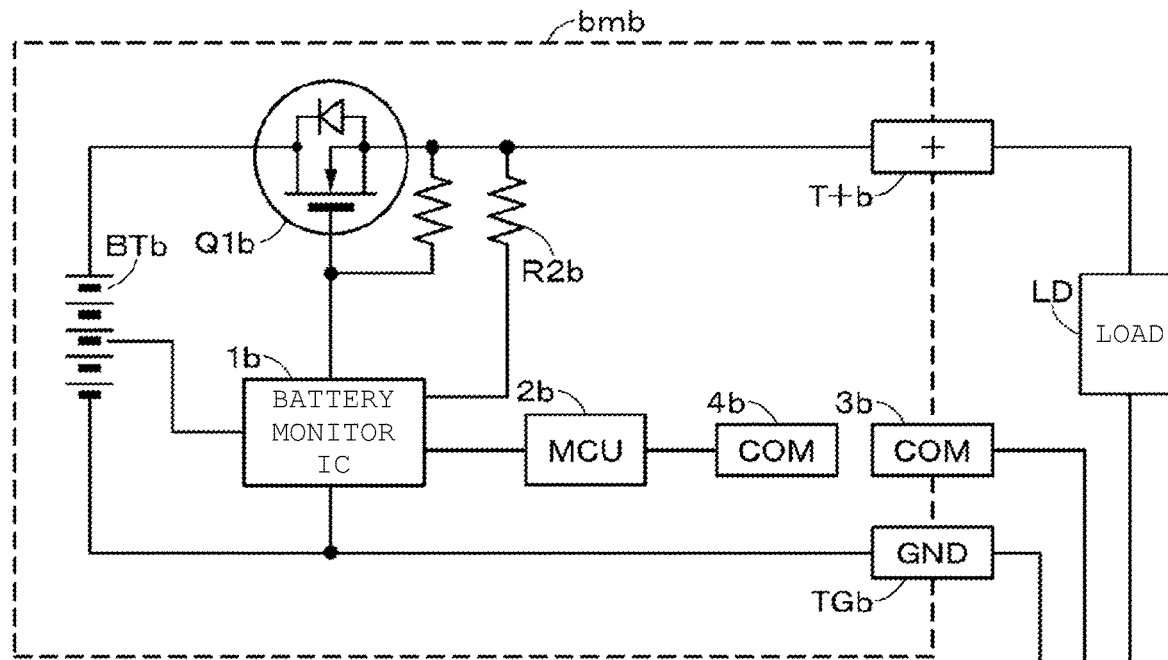
FIG. 2 is a connection diagram illustrating a configuration in the case where conventional battery modules are connected in series.
Figure 2:
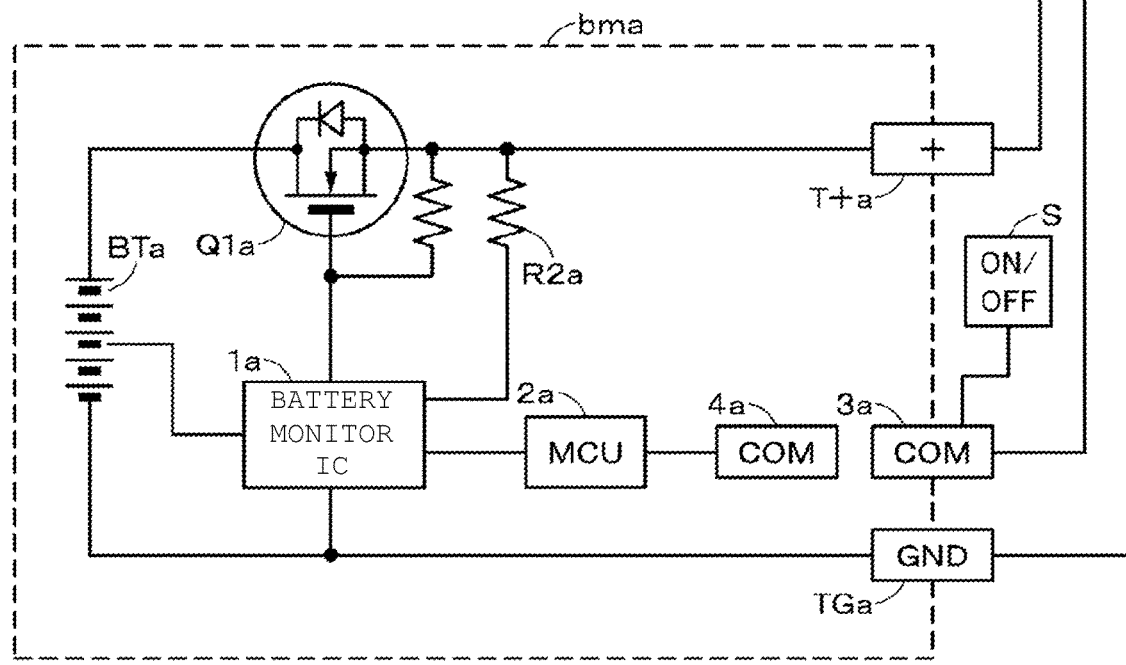

The above-mentioned battery module bm turns on/off the FET (Q) in response to a discharge request from the load to control ON/OFF of the output. FIG. 2 shows a configuration in which two battery modules bma and bmb are connected in series. That is, the positive output terminal T+a of the battery module bma is connected to the negative output terminal TGb of the battery module bmb, and between the positive output terminal T+b of the battery module bmb and the negative output terminal TGa of the battery module bma, the load LD is connected. In the battery module bma, the elements corresponding to each element in FIG. 1 are indicated by adding a suffix a, and the elements corresponding to each element in FIG. 1 in the battery module bmb are indicated by adding suffix b.

A discharge request for controlling ON/OFF of the voltage output is supplied to the communication terminals 3a and 3b of the battery modules bma and bmb, respectively, from the outside. The discharge request is supplied to the MCU2a and the MCU2b, and the outputs of the MCU2a and the MCU2b are supplied to the battery monitor IC1a and the battery monitor IC1b, respectively, so that ON/OFF of the FETs (Q1a) and (Q1b) are controlled.

The discharge control operation of the conventional battery module will be described. First, the operation in the case of a single configuration as shown in FIG. 1 will be described.

First, the operation at the time when the output is ON will be described.

The MCU 2 receives the discharge request through the communication terminals 3 and 4. The MCU2 controls the battery monitor IC1, and the battery monitor IC1 turns on the FET (Q1). The output voltage of the battery part BT appears at the positive output terminal T+ and the negative output terminal TG.

Next, the operation at the time when the output is OFF will be described.

The MCU2 receives the discharge stop request through the communication terminals 3 and 4. The MCU2 controls the battery monitor IC1, and the battery monitor IC1 turns off the FET (Q1). The output voltage of the battery part BT is not output to the positive output terminal T+ and the negative output terminal TG.

No problem arises with regard to the independent discharge control of the battery module bm.

Next, the operation in the case where the battery modules bma and bmb are connected in series as shown in FIG. 2 will be described.

First, the operation at the time when the output is ON will be described.

The MCU2a receives the discharge request through the communication terminals 3a and 4a. The MCU2a controls the battery monitor IC1a, and the battery monitor IC1a turns on the FET (Q1a). The MCU2b receives the discharge request through the communication terminals 3b and 4b. As an example, the battery module bma and the battery module bmb are sequentially driven. The MCU2b controls the battery monitor IC1b, and the battery monitor IC1b turns on the FET (Q1b). A voltage obtained by adding the voltage of the battery part BTa to the voltage of the battery part BTb is applied to the load LD connected between the positive output terminal T+b and the negative output terminal TGa.

Next, the operation at the time when the output is OFF will be described.

The MCU2a and the MCU2b receive the discharge stop request through the communication terminals 3a, 4a and 3b, 4b. The MCU2a and the MCU2b control the battery monitor IC1a and the battery monitor IC1b, respectively, and the battery monitor IC1a and the battery monitor ICb turn off the FET (Q1a) and the FET (Q1b), respectively. The output voltages of the battery parts BTa and BTb are not output to the positive output terminal T+b and the negative output terminal TGa.

No problem arises in the case where the FET (Q1a) and the FET (Q1b) are turned off at the same time when the output is OFF. However, when the FET (Q1a) and the FET (Q1b) are turned off at different timing and, for example, the FET (Q1b) of the upper battery module bmb is turned off earlier, a problem arises as described below.

When the FET (Q1b) turns off, the positive output terminal T+b is lowered. On the other hand, since the FET (Q1a) is ON, the voltage of the battery part BTa appears at the positive output terminal T+a and the negative output terminal TGb. Therefore, a voltage is applied between the gate and the source of the FET (Q1b), and the FET (Q1b) turns on.

To describe with a specific voltage value, each of the battery units BTa and BTb generates a voltage of 41 V, and as a result of the series connection, a voltage of 82 V is applied to the load LD. Here, when the FET (Q1b) is turned off by the discharge stop request, the voltage of the source of the FET (Q1b) drops to 36.4 V. At this time, since the FET (Q1a) is not OFF, a voltage of 41 V is applied to the negative output terminal TGb. As a result, the FET (Q1b) is turned on. The voltage drop (0.6 V) due to the diode inside the battery monitor IC1b is subtracted (40.4 V−36.4 V=4 V) is applied between the gate and the source of the FET (Q1b). This voltage value is close to the gate threshold voltage of the FET (Q1b).

As described above, the ON resistance becomes a large value in a state where it is ON near the gate threshold voltage of the FET (Q1b). Since 82 V is supplied to the drain of the FET (Q1b) by the battery part BTb, the potential difference between the drain and the source of the FET (Q1b) is large (i.e., 82 V−36.4 V=45.6 V) and a large current may flow through the FET (Q1b) to exceed the safe operation region of the FET (Q1b).

Figure 3:
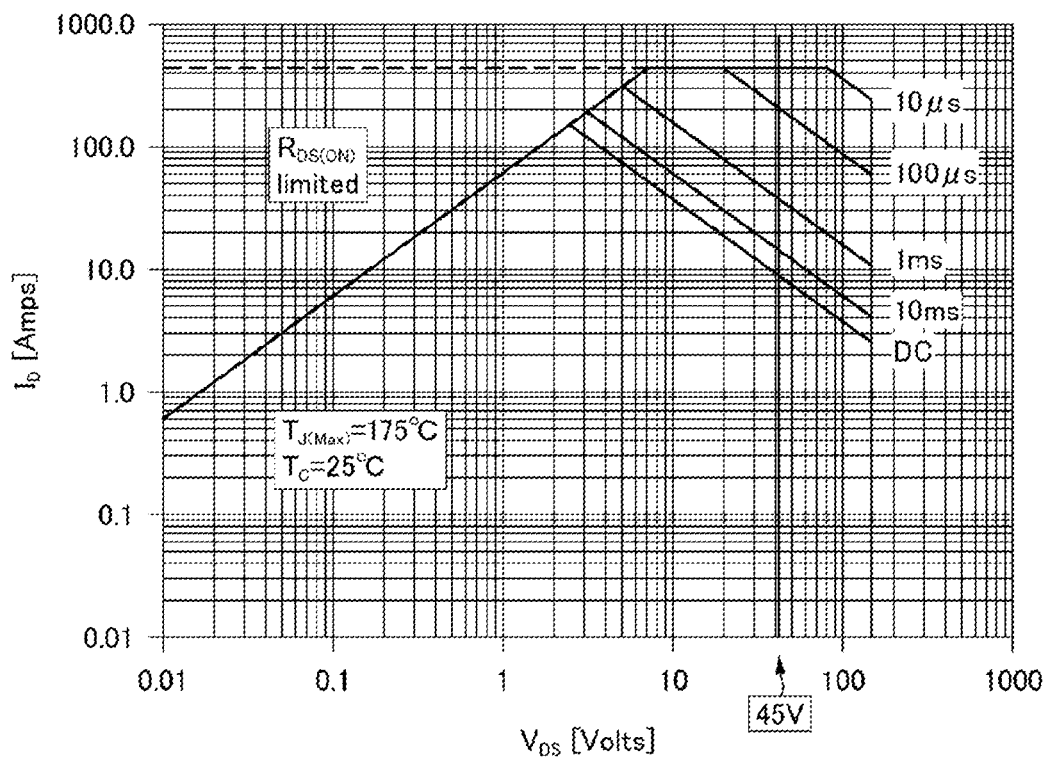
FIG. 3 is a graph for explaining an area of safe operation ASO of the FET.

FIG. 3 shows an example of an area of safe operation ASO (Area of Safe Operation) of the FET (Q1). The horizontal axis represents the drain-source voltage $V_{DS}$, and the vertical axis represents the drain current $I_D$. A safe operation area ASO has been obtained for each width (time) of a single pulse. The range inside each line in FIG. 3 is the safe operation area ASO. In the above example, since $V_{DS}$=45 V, if the drain current value in the case of this $V_{DS}$ value is large, the FET is broken beyond the allowable loss.

Figure 4:
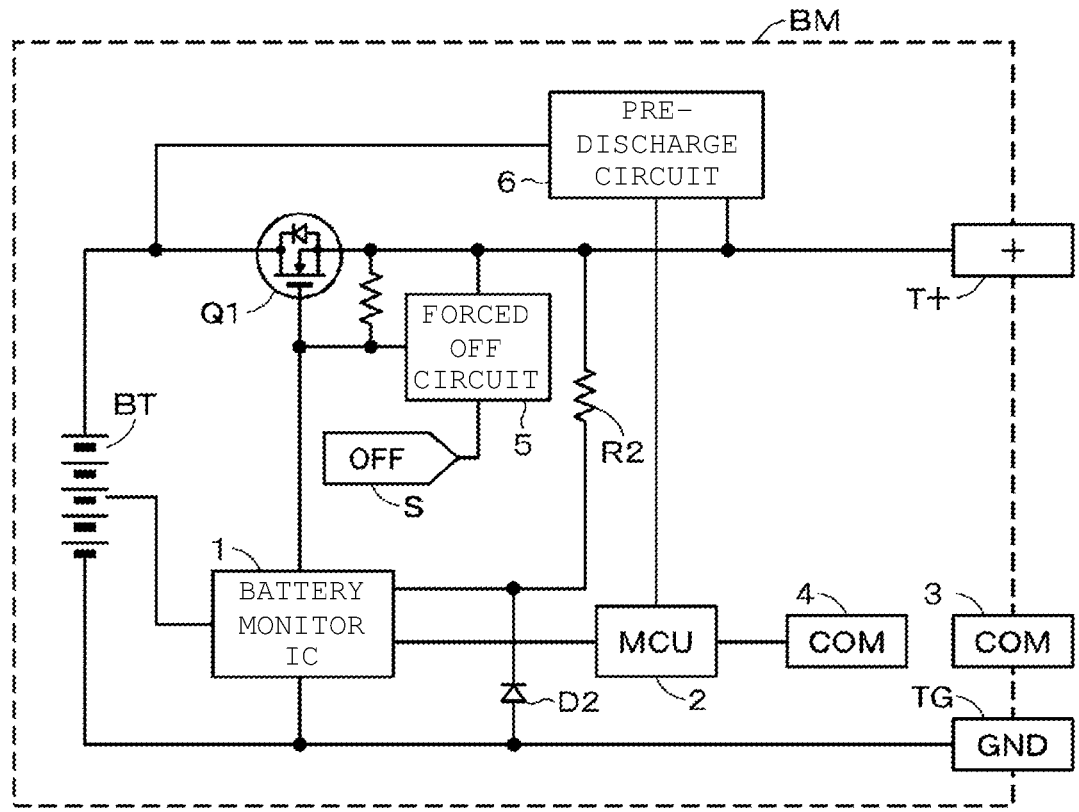
FIG. 4 is a connection diagram of a battery module according to an embodiment of the present technology.

An embodiment of a battery module BM according to the present technology will be described with reference to FIG. 4. Components corresponding to the above-mentioned conventional battery module bm are denoted by the same reference symbols. The + side of the battery part BT in which a plurality of battery cells are connected in series is led out as the positive output terminal T+ through the drain-source path of the N-channel MOSFET (Q1). That is, the first FET (Q1) is connected to the high side. A power MOSFET capable of a large current is used as the FET (Q1). The negative (−) side of the battery part BT is led out as the negative output terminal TG. The FET (Q1) has the function of a discharge load switch. An N-channel MOSFET is connected between the FET (Q1) and the + side of the battery part BT, as a charge load switch, so that the drain-source path is opposite to that of the FET (Q1), but for simplicity the FET is omitted.

The gate of the FET (Q1) is driven by the output of a charge pump of the battery monitor IC1. Since the FET (Q1) is connected to the high side, a high side gate driver is used. The battery monitor IC1 monitors an individual voltage of each cell of the battery part BT, boosts the boosted voltage by the charge pump, and turns on/off the FET (Q1). There are also cases where the charge pump portion is configured to be independent.

A resistor R2 is connected between the source of the FET (Q1) and the battery monitor IC1. The resistor R2 is a resistor for generating the reference potential (source voltage) for the battery monitor IC1 to turn on the FET (Q1) by the charge pump. Further, the resistor R2 is provided for monitoring the output voltage.

Furthermore, in order to prevent the battery monitor IC1 from being destroyed when the positive output terminal T+ becomes a minus potential lower than the negative output terminal TG at the time of series connection, a diode D2 for clamping a voltage input terminal of the battery monitor IC1 to a potential of about −0.6 V is connected.

The MCU2 is connected to the battery monitor IC1. The MCU2 receives an ON/OFF signal of discharge request (FET (Q1) from the load through the communication terminals (COM) 3 and (COM) 4 to the MCU2 and controls the FET (Q1) through the battery IC1. The communication terminals 3 and 4 are insulated. For example, a photocoupler or the like is used as the communication terminals 3 and 4.

A forced OFF circuit 5 is connected between the gate of the FET (Q1) and the source of the FET (Q1). The forced OFF circuit 5 forcibly turns off the first FET (Q1) by short-circuiting between the gate and the source of the first FET. An OFF signal S is supplied to the forced OFF circuit 5.

Further, the pre-discharge circuit 6 is connected in parallel with the drain-source path of the FET (Q1). The pre-discharge circuit 6 raises the potential of the positive output terminal T+ prior to turning on the first FET when turning on the first FET. In the configuration in which the battery modules are connected in series, the pre-discharge circuit 6 is connected for raising the load voltage in advance in order to prevent an ON action from being rendered inoperable by the forced OFF circuit 5 when turning on the FET (Q1).

Figure 5:
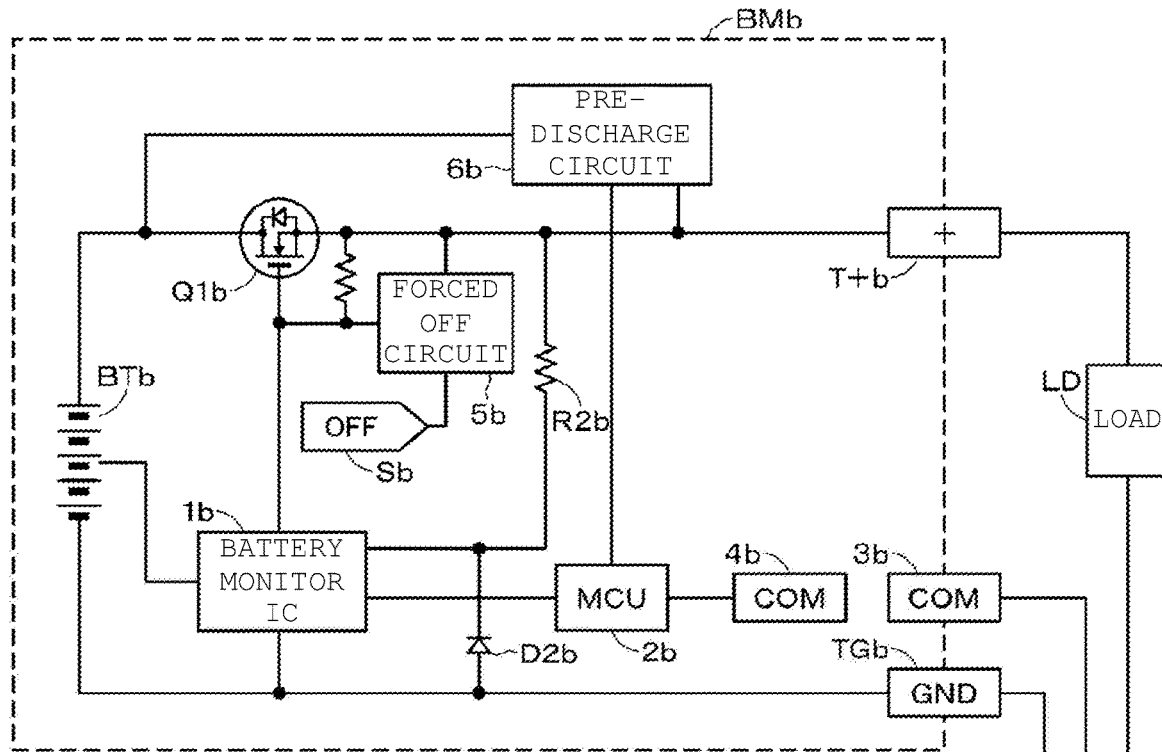
FIG. 5 is a connection diagram illustrating a configuration in the case where battery modules according to an embodiment of the present technology are connected in series.
Figure 5:
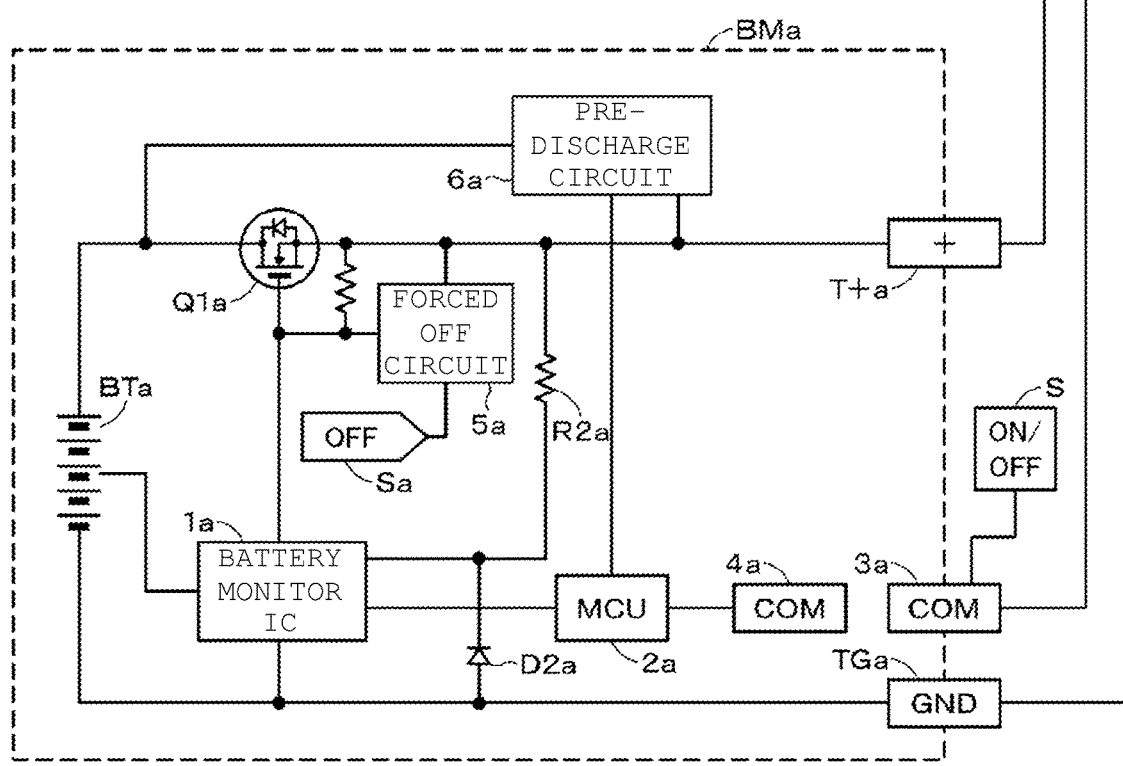

The above-mentioned battery module BM controls ON/OFF of the output by turning on/off the FET (Q1) in response to a discharge request from the load. FIG. 5 shows a configuration in which two battery modules BMa and BMb are connected in series. That is, the positive output terminal T+a of the battery module BMa is connected to the negative output terminal TGb of the battery module BMb, and the load LD is connected between the positive output terminal T+b of the battery module BMb and the negative output terminal TGa of the battery module BMa. In the battery module BMa, the elements corresponding to each element in FIG. 4 are indicated by adding a suffix a, and the elements corresponding to each element in FIG. 4 in the battery module BMb are indicated by adding suffix b.

A discharge request for controlling ON/OFF of the voltage output is supplied to the communication terminals 3a and 3b of the battery modules BMa and BMb from the outside. The discharge request is supplied to the MCU2a and the MCU2b, and the outputs of the MCU2a and the MCU2b are supplied to the battery monitor IC1a and the battery monitor IC1b, respectively, so that ON/OFF of the FETs (Q1a) and (Q1b) are controlled.

An operation of discharge control of an embodiment of the present technology will be described. First, the operation in the case of a single configuration as shown in FIG. 4 will be described.

First, the operation at the time when the output is ON will be described.

The MCU 2 receives the discharge request through the communication terminals 3 and 4. The pre-discharge circuit 6 is turned on by the MCU2. When the MCU2 controls the battery monitor IC1 and the battery monitor IC1 recognizes that the voltage of the positive output terminal T+ is higher than the potential of the negative output terminal TG (positive potential), the FET (Q1) is turned on. The output voltage of the battery part BT appears at the positive output terminal T+ and the negative output terminal TG. Then, the pre-discharge circuit 6 is turned off. Note that when the battery module recognizes, in advance, that the battery module BM is used alone, it is not necessary to perform the operation of turning off the pre-discharge circuit 6 after turning on the pre-discharge circuit 6.

Next, the operation at the time when the output is OFF will be described.

The MCU2 receives the discharge stop request through the communication terminals 3 and 4. The MCU2 controls the battery monitor IC1, and the battery monitor IC1 turns off the FET (Q1). The forced OFF circuit 5 is inoperative.

Next, the operation in the case where the battery modules BMa and BMb are connected in series as shown in FIG. 5 will be described.

First, the operation at the time when the output is ON will be described. When the MCU2a receives the discharge request through the communication terminals 3a and 4a, the MCU2a turns on the pre-discharge circuit 6a.

When the MCU2b receives the discharge request through the communication terminals 3b and 4b, the MCU2b turns on the pre-discharge circuit 6b.

When the battery monitor IC1a recognizes that the potential of the positive output terminal T+a is equal to or higher than the potential of the negative output terminal TGa (positive voltage), the battery monitor IC1a turns on the FET (Q1a).

When the battery monitor IC1b recognizes that the potential of the positive output terminal T+b is equal to or higher than the potential of the negative output terminal TGb (positive voltage), the battery monitor IC1b turns on the FET (Q1b).

The pre-discharge circuits 6a and 6b are turned off. A voltage obtained by adding the voltage of the battery part BTa to the voltage of the battery part BTb is applied to the load LD connected between the positive output terminal T+b and the negative output terminal TGa.

Next, the operation at the time when the output is OFF will be described.

The MCU2a and the MCU2b receive the discharge stop request through the communication terminals 3a, 4a and 3b, 4b.

The FET (Q1b) of the battery module BMb is turned off first. The potential of the positive output terminal T+b is lowered.

The forced OFF circuits 5a and 5b are operated by the OFF signal, between the gate and the source of the FET (Q1a) and the FET (Q1b) are short-circuited, and thereby, the FET (Q1a) and the FET (Q1b) are turned off, and it is possible to prevent the FET (Q1a) and the FET (Q1b) from being turned on again.

Figure 6:
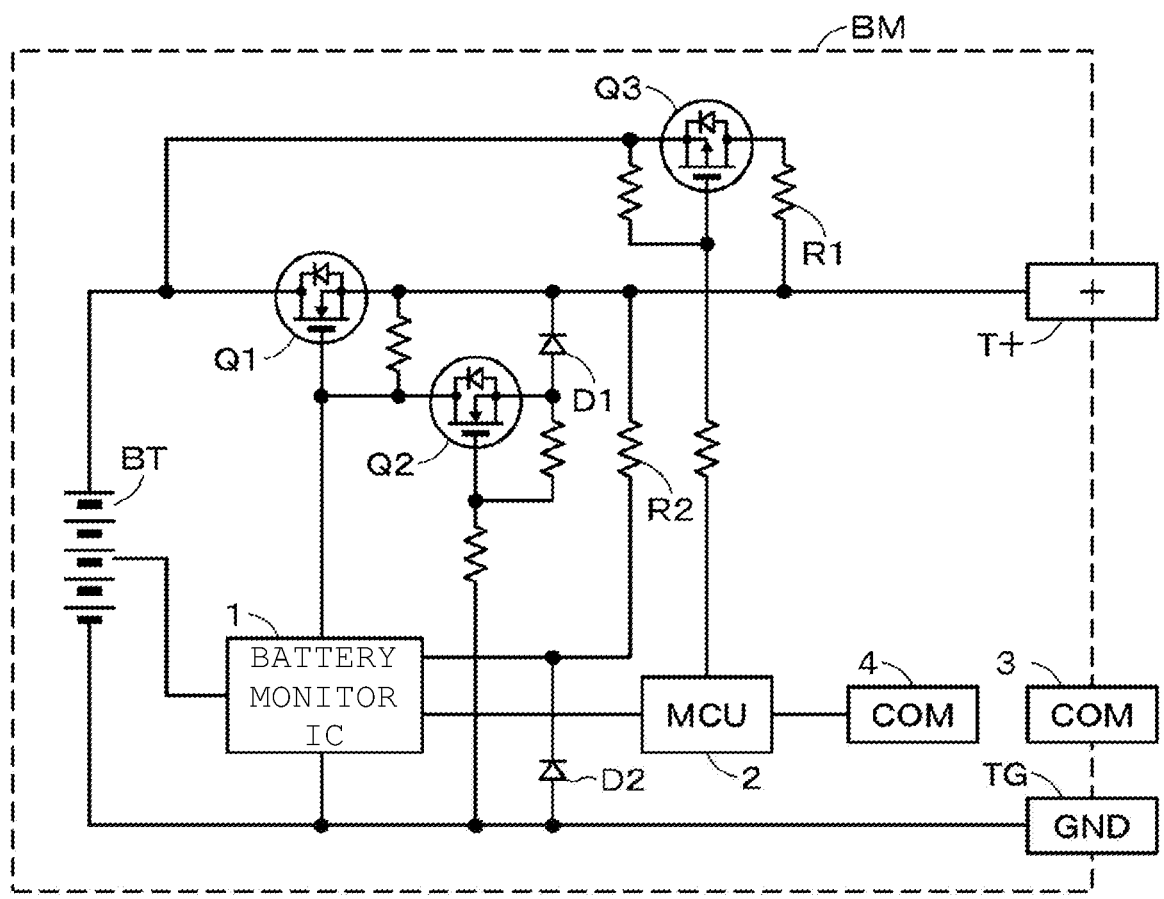
FIG. 6 is a specific connection diagram of a battery module according to an embodiment of the present technology.

FIG. 6 shows a more specific connection configuration of the battery module BM according to the present technology. Components corresponding to the above-mentioned battery module BM are denoted by the same reference symbols. An N-channel MOSFET (Q2) is connected as the forced OFF circuit 5 described above. Further, a P-channel MOSFET (Q3) is connected as the pre-discharge circuit 6 described above.

The gate of the FET (Q1) and the drain of the FET (Q2) are connected to each other, and the source of the FET (Q1) and the source of the FET (Q2) are connected with the diode D1 interposed therebetween. The gate and the source of the FET (Q2) are connected via a resistor, and the gate of the FET (Q2) is connected to the low side (negative output terminal TG) through a resistor.

The FET (Q2) is provided in order to forcibly turn off the FET (Q1) when the potential of the positive output terminal T+ becomes lower than that of the negative output terminal TG in connecting the battery modules in series by turning on the FET (Q2) to short-circuit between the gate and the source of the FET (Q1). The FET (Q2) is turned off in normal times at which the potential of the positive output terminal T+ is equal to or higher than the potential of the negative output terminal TG. The FET (Q2) does not need a power MOSFET and can use a small N-channel MOSFET. The gate-source threshold voltage of the FET (Q2) is set to a smaller value, for example, 2.4 V, as compared with the gate-source threshold voltage (e.g. 4 V) of the FET (Q1). As a result, the FET (Q2) turns on before the FET (Q1) for a voltage change. The diode D1 is a backflow prevention diode for preventing between the gate and the source of the FET (Q1) from being short-circuited through the parasitic diode of the FET (Q1) and becoming unable to turn on.

Further, an FET (Q3) to which the drain and source of the FET (Q1) are connected is provided. The gate and the source of the FET (Q3) are connected through a resistor, and the gate of the FET (Q3) is connected to the MCU2 through a resistor. Further, the drain of the FET (Q3) is connected to the positive output terminal T+ via the resistor R1.

In the configuration in which the battery modules are connected in series, FET (Q3) is the pre-discharge P-channel MOSFET for raising the load voltage in advance in order to prevent an ON action from being rendered inoperable by the FET (Q2) when turning on the FET (Q1). Since it is connected for the purpose of raising the potential, a small FET is used as the FET (Q3). The resistor R1 is connected in order to limit the output current of pre-discharge P-channel MOSFET (Q3).

Figure 7:
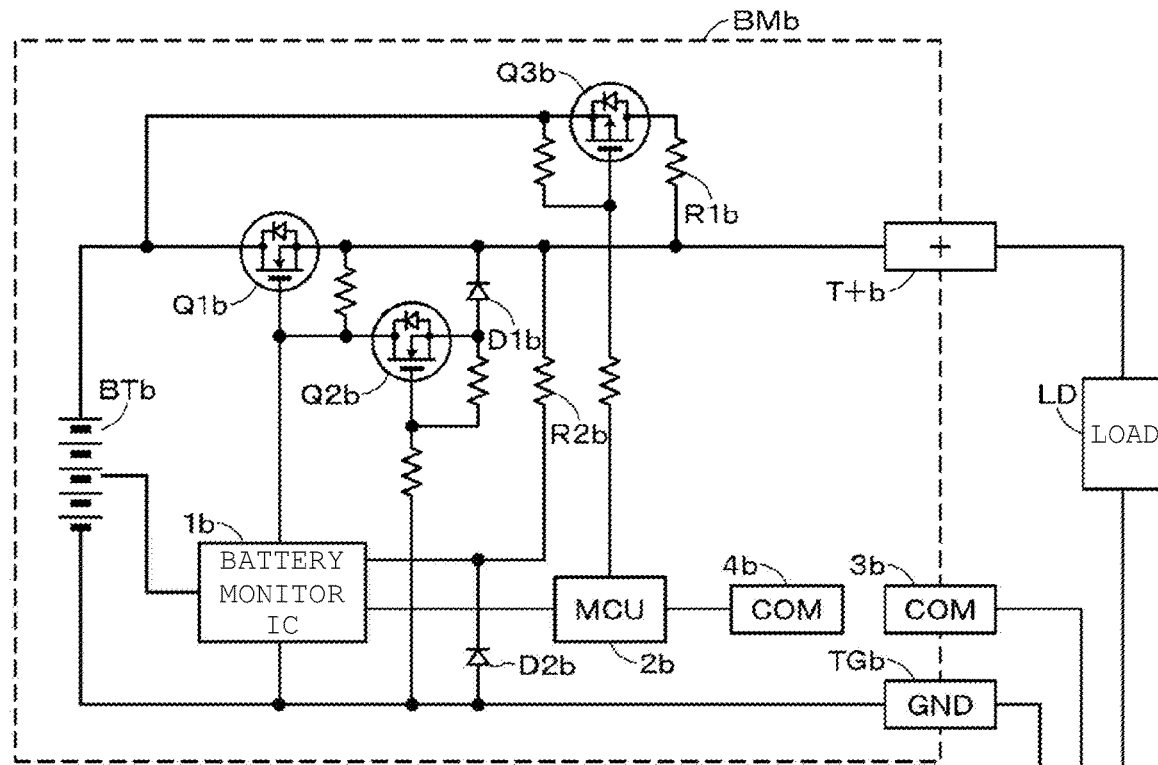
FIG. 7 is a connection diagram illustrating a configuration of a battery device in which the battery modules shown in FIG. 6 are connected in series.
Figure 7:
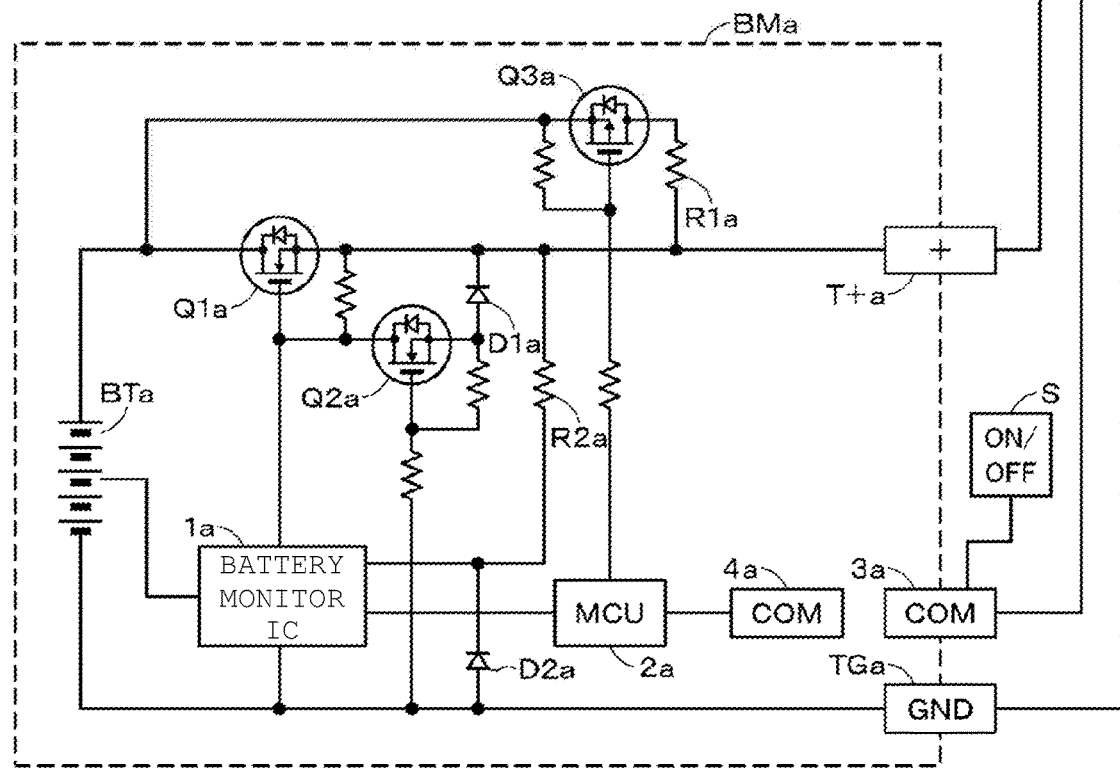

The above-mentioned battery module BM controls ON/OFF of the output by turning on/off the FET (Q1) in response to a discharge request from the load. FIG. 7 shows a configuration in which two battery modules BMa and BMb are connected in series. That is, the positive output terminal T+a of the battery module BMa is connected to the negative output terminal TGb of the battery module BMb, and the load LD is connected between the positive output terminal T+b of the battery module BMb and the negative output terminal TGa of the battery module BMa. In the battery module BMa, the elements corresponding to each element in FIG. 6 are indicated by adding a suffix a, and the elements corresponding to each element in FIG. 6 in the battery module BMb are indicated by adding suffix b.

A discharge request for controlling ON/OFF of the voltage output is supplied to the communication terminals 3a and 3b of the battery modules BMa and BMb from the outside. The discharge request is supplied to the MCU2a and the MCU2b, and the outputs of the MCU2a and the MCU2b are supplied to the battery monitor IC1a and the battery monitor IC1b, respectively, so that ON/OFF of the FETs (Q1a) and (Q1b) are controlled.

An operation of discharge control of an embodiment of the present technology will be described. First, the operation in the case of a single configuration as shown in FIG. 6 will be described.

First, the operation at the time when the output is ON will be described.

The MCU 2 receives the discharge request through the communication terminals 3 and 4. The pre-discharge FET (Q3) is turned on by the MCU2. When the MCU2 controls the battery monitor IC1 and the battery monitor IC1 recognizes that the voltage of the positive output terminal T+ is higher than the potential of the negative output terminal TG (positive potential), the FET (Q1) is turned on. The output voltage of the battery part BT appears at the positive output terminal T+ and the negative output terminal TG. FET (Q3) is turned off. When the battery module recognizes, in advance, that the battery module BM is used independently, it is not necessary to turn on the FET (Q3) and turn off the FET (Q3).

Next, the operation at the time when the output is OFF will be described.

The MCU2 receives the discharge stop request through the communication terminals 3 and 4. The MCU2 controls the battery monitor IC1, and the battery monitor IC1 turns off the FET (Q1). Since the potential of the positive output terminal T+ is equal to the potential of the negative output terminal TG, the FET (Q2) is inoperative.

Figure 8:
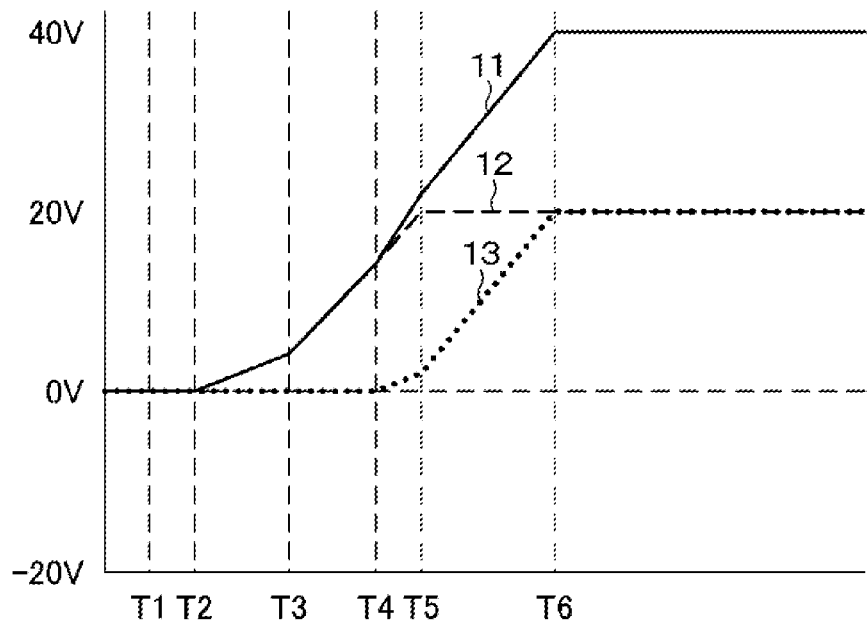

Next, the operation when the battery modules BMa and BMb are connected in series as shown in FIG. 7 will be described. FIG. 8 shows the output voltage of the battery module when the output is ON. As an example, the case where the battery parts BTa and BTb each output a voltage of 20 V is shown. A horizontal axis of FIG. 8 is the time axis. In FIG. 8, the voltage change 11 indicates a change in the load voltage, the voltage change 12 indicates a change in the output voltage of the lower battery module BMa, and the voltage change 13 indicates a change in the output voltage of the upper battery module BMb.

First, the operation at the time of output ON will be explained along the flow of time.

T1: The MCU2a receives the discharge request through the communication terminals 3a and 4a.

T2: The MCU2a turns on the FET (Q3a).

T3: The MCU2b receives the discharge request through the communication terminals 3b and 4b.

T4: The MCU2b turns on the FET (Q3b).

T5: When the battery monitor IC1a recognizes that the potential of the positive output terminal T+a is equal to or higher than the potential of the negative output terminal TGa (positive voltage), the battery monitor IC1a turns on the FET (Q1a).

T6: When the battery monitor IC1b recognizes that the potential of the positive output terminal T+b is equal to or higher than the potential of the negative output terminal TGb (positive voltage), the battery monitor IC1b turns on the FET (Q1b).

FET (Q3a) and FET (Q3b) are turned off. A voltage obtained by adding the voltage of the battery part BTa to the voltage of the battery part BTb is applied to the load LD connected between the positive output terminal T+b and the negative output terminal TGa.

Figure 9:
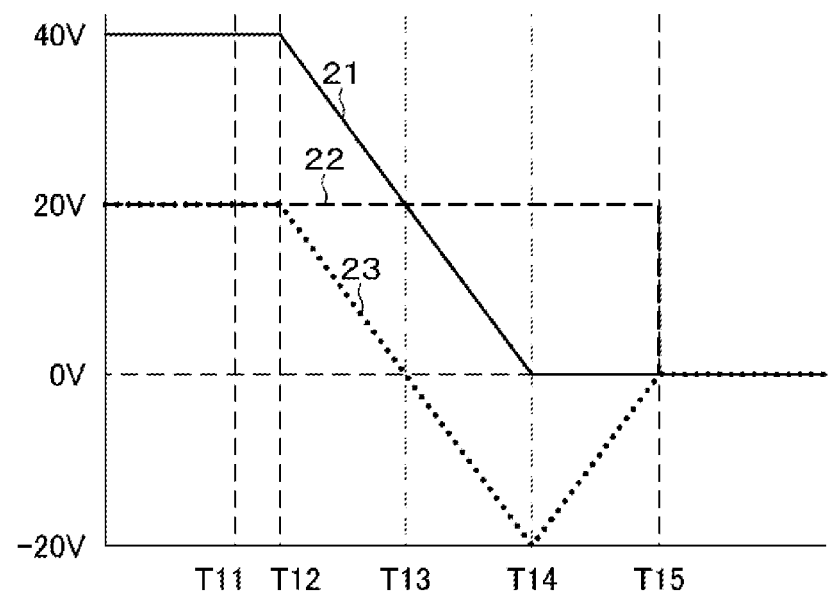
FIG. 9 is a graph illustrating a voltage transition at the time when the battery device is OFF.

Next, the operation at the time when the output is OFF will be described. FIG. 9 shows the output voltage of the battery module when the output is OFF. As an example, the case where the battery parts BTa and BTb each output a voltage of 20 V is shown. The horizontal axis of FIG. 9 is the time axis. In FIG. 9, the voltage change 21 indicates the change in the load voltage, the voltage change 22 indicates the change in the output voltage of the lower battery module BMa, and the voltage change 23 indicates the change in the output voltage of the upper battery module BMb.

T11: The MCU2a and the MCU2b receive the discharge stop request through the communication terminals 3a, 4a and 3b, 4b.

T12: FET (Q1b) of battery module BMb turns off first. The potential of the positive output terminal T+b is lowered.

T13: The potential of the positive output terminal T+b of the battery module BMb of the battery module BMb becomes equal to or lower than the potential of the negative output terminal TGb by the path of the diode D2 and the resistor R2. In this state, the gate voltage of the FET (Q2b) becomes higher than the source voltage of the FET (Q2b), and the FET (Q2b) turns on. When the FET (Q2b) is turned on, the gate and source of the FET (Q1b) are short-circuited, and therefore the FET (Q1b) is forcibly turned off. Therefore, it is possible to prevent the FET (Q1b) from turning on again after being turned off.

T14: Even if the potential of the positive output terminal T+b of the battery module BMb becomes equal to or lower than the potential of the negative output terminal TGb, the ground side potential of the battery monitor IC1b is clamped to about (ground potential −0.6 V) by the diode D2 to prevent the destruction of the battery monitor IC1b. T15: The FET (Q1a) of the battery module BMa is turned off, a closed circuit of the battery and the load is cut off, and the battery is completely turned off.

Even when the FET (Q1a) of the battery module BMa is turned off prior to the FET (Q1b), the upper side and the lower side of the battery module only replace each other and the same operation as described above is performed. In the present technology, not only when intentionally turned off but also when protection etc. is activated and suddenly the FET (Q1) of the load switch is turned off, the output can be safely turned off without trouble.

As described above, according to the present technology, a plurality of battery modules can be connected in series like a dry battery to easily increase the voltage. Moreover, by using an N channel FET as a load switch, it is possible to reduce loss and cost as compared with using a P-channel FET. Furthermore, the protection function of each of battery module operates independently, and even when the terminal voltage becomes a negative potential equal to or lower than the potential of the negative output terminal TG, failure of the control circuit can be prevented. Therefore, it is possible to eliminate the need for a complicated communication function to synchronize the OFF operation and to use a general-purpose communication function.

The battery device according to an embodiment of the present disclosure described above can be used for mounting or supplying electric power to devices such as electronic devices, electric vehicles, electric storage devices, and the like.

Examples of the electronic device include a notebook computer, a smartphone, a tablet terminal, a PDA (portable information terminal), a mobile phone, a wearable terminal, a cordless phone handset, a video movie, a digital still camera, an electronic book, an electronic dictionary, a music player, a radio, a headphone, a game machine, a navigation system, a memory card, a pacemaker, a hearing aid, an electric tool, an electric shaver, a refrigerator, an air conditioner, a television set, a stereo, a water heater, a microwave oven, a dishwasher, a washing machine, a drier, lighting equipment, a toy, medical equipment, a robot, a load conditioner, a traffic light, and the like.

Examples of electric vehicles include railway vehicles, golf carts, electric carts, electric automobiles (including hybrid automobile), and the like, which are used as a power source for driving or an auxiliary power source thereof.

Examples of the electric storage device include power sources for electric power storage for buildings including houses or power generation facilities.

A specific example of an electric storage system using a battery device of the above-mentioned present disclosure among the above-mentioned application examples will be described below.

Examples of the electric storage system include, for example, the following configuration. The first electric storage system is an electric storage system in which the electric storage device is charged by a power generation device that generates power from renewable energy. The second electric storage system is an electric storage system which has an electric storage device and supplies electric power to an electronic device connected to the electric storage device. The third electric storage system is an electronic device which receives electric power supply from the electric storage device. These electric storage systems are implemented as a system which achieves efficient supply of electric power in cooperation with an external electric power supply network.

Furthermore, the fourth electric storage system is an electric vehicle having a conversion device that receives supply of electric power from the electric storage device and converts the electric power into a driving force of a vehicle, and a control device that performs information processing on vehicle control based on information on the electric storage device. The fifth electric storage system is an electric power system including an electric power information transmitting and receiving part which transmits and receives signals to and from another device via a network, and performing charge-discharge control of the above-mentioned electric storage device based on information received by the transmitting and receiving unit. The sixth electric storage system is an electric power system which receives electric power supply from the above-mentioned electric storage device or supplies electric power from the power generation device or the power network to the electric storage device.

Figure 10:
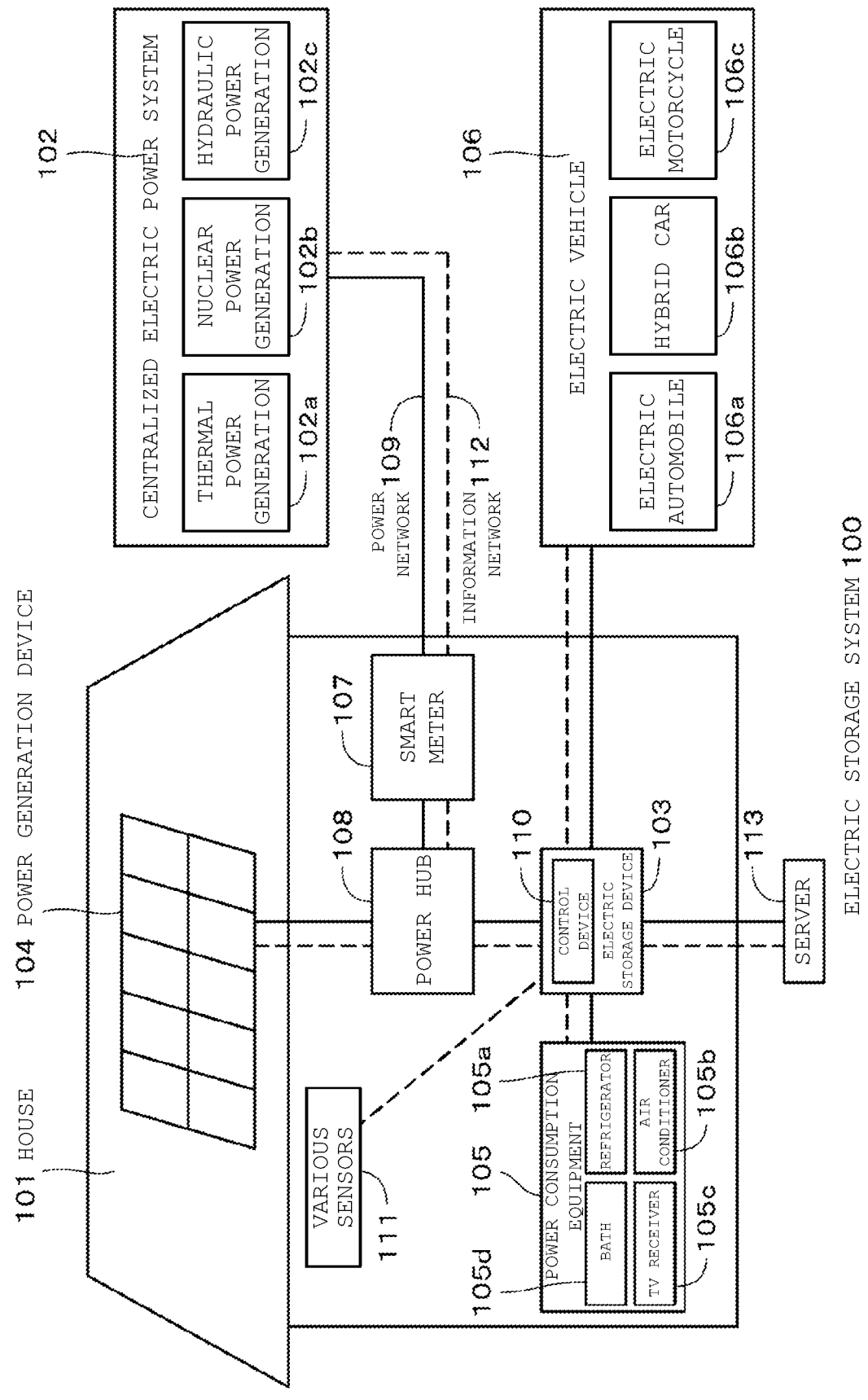
FIG. 10 is a schematic view illustrating an electric storage system for a residential use according to an embodiment of the present technology.

An example in which the electric storage device using the battery of the present disclosure is applied to a residential electric storage system will be described with reference to FIG. 10. For example, in the electric storage system 100 for houses 101, electric power is supplied from a centralized electric power system 102 such as a thermal power generation 102a, a nuclear power generation 102b, and a hydraulic power generation 102c to the electric storage device 103 via a power network 109, an information network 112, a smart meter 107, a power hub 108, and the like. With this, electric power is supplied from an independent power source such as domestic power generation device 104 to the electric storage device 103. The electric power supplied to the electric storage device 103 is stored. Electric power to be used in the house 101 is supplied using the electric storage device 103. A similar electric storage system can be used not only for the house 101 but also for a building.

In the house 101, the power generation device 104, power consumption equipment 105, the electric storage device 103, a control device 110 that controls each device, the smart meter 107, and sensors 111 that acquire various kinds of information are provided. The respective devices are connected by the power network 109 and the information network 112. A solar cell, a fuel cell, or the like is used as the power generation device 104, and the generated electric power is supplied to the power consumption equipment 105 and/or the electric storage device 103. The power consumption equipment 105 is a refrigerator 105a, an air conditioner 105b that is an air conditioner, a television set 105c that is a television receiver, a bath 105d, and the like. Furthermore, the power consumption equipment 105 includes an electric vehicle 106. The electric vehicle 106 is an electric automobile 106a, a hybrid car 106b, an electric motorbicycle 106c or the like.

The battery of the present disclosure is applied to the electric storage device 103. The battery of the present disclosure may include, for example, the above-mentioned lithium ion secondary battery. The smart meter 107 has a function of measuring the use amount of commercial power and sending the use amount measured to an electric power company. The power network 109 may be any one or combination of DC (direct current) power supply, AC (alternate current) power supply, and non-contact power supply.

The various sensors 111 are, for example, a human detection sensor, an illuminance sensor, an object detection sensor, a power consumption sensor, a vibration sensor, a contact sensor, a temperature sensor, an infrared sensor, and the like. Information acquired by the various sensors 111 is transmitted to the control device 110. Based on the information from the sensors 111, the state of weather, the state of person, etc., are grasped and the power consumption equipment 105 is automatically controlled to allow minimization of the energy consumption. Further, the control device 110 can transmit information relating to the house 101 to an external electric power company or the like via an Internet.

Branching of the power line, processing of DC-AC conversion, and the like are carried out by the power hub 108. As a communication system of the information network 112 connected to the control device 110, there are a method of using a communication interface such as UART (Universal Asynchronous Receiver-Transmitter: transmitting/receiving circuit for asynchronous serial communication) and a method of utilizing a sensor network based on a wireless communication standard such as Bluetooth (registered trademark), ZigBee or Wi-Fi. Bluetooth (registered trademark) system is applied to multimedia communication and allows communication of a one-to-many connection. ZigBee is a standard using a physical layer of IEEE (Institute of Electrical and Electronics Engineers) 802.15.4. IEEE 802.15.4 is the name of a short-range wireless network standard called PAN (Personal Area Network) or W (Wireless) PAN.

The control device 110 is connected to an external server 113. The server 113 may be managed by any of the house 101, an electric power company, and a service provider. The information transmitted and received by the server 113 is, for example, power consumption information, life pattern information, electric power bill, weather information, natural disaster information, and information relating to power trading. These pieces of information may be transmitted from and received to power consumption equipment (for example, a television receiver) in the home, or may be transmitted from and received to a device outside the home (for example, mobile phone, etc.). These pieces of information may be displayed on apparatus having a display function, such as a television receiver, a mobile phone, and a PDA (personal digital assistants).

The control device 110 that controls the respective parts is configured by CPU (Central Processing Unit), RAM (Random Access Memory), ROM (Read Only Memory) and the like, and is stored in the electric storage device 103 in this example. The control device 110 is connected to the electric storage device 103, the domestic power generation device 104, the power consumption equipment 105, the various sensors 111, and the server 113 via the information network 112, and has, for example, a function of adjusting the use amount of commercial power and the amount of power generation. In addition to this, the control device 110 may have a function of carrying out power trading in a power market and the like.

As described above, not only electric power by the centralized electric power system 102 of the thermal power generation 102a, the nuclear power generation 102b, the hydraulic power generation 102c or the like, but also generated electric power of the domestic power generation device 104 (solar power generation, wind power generation) can be stored in the electric storage device 103. Therefore, even though the generated electric power of the domestic power generation device 104 varies, it is possible to perform such control that the amount of electric power sent to the outside is made constant or discharge is performed as much as needed. For example, electric power obtained by solar power generation is stored in the electric storage device 103 and low-cost late-night power is stored in the electric storage device 103 in the night. Furthermore, the electric power stored by the electric storage device 103 is discharged and utilized in a high-cost time zone in the daytime.

Although the example in which the control device 110 is stored in the electric storage device 103 has been described in this example, the control device 110 may be stored in the smart meter 107 or may be configured singly. Further, the electric storage system 100 may be used for a plurality of homes in a collective housing, or may be used for a plurality of single-family houses.

Figure 11:
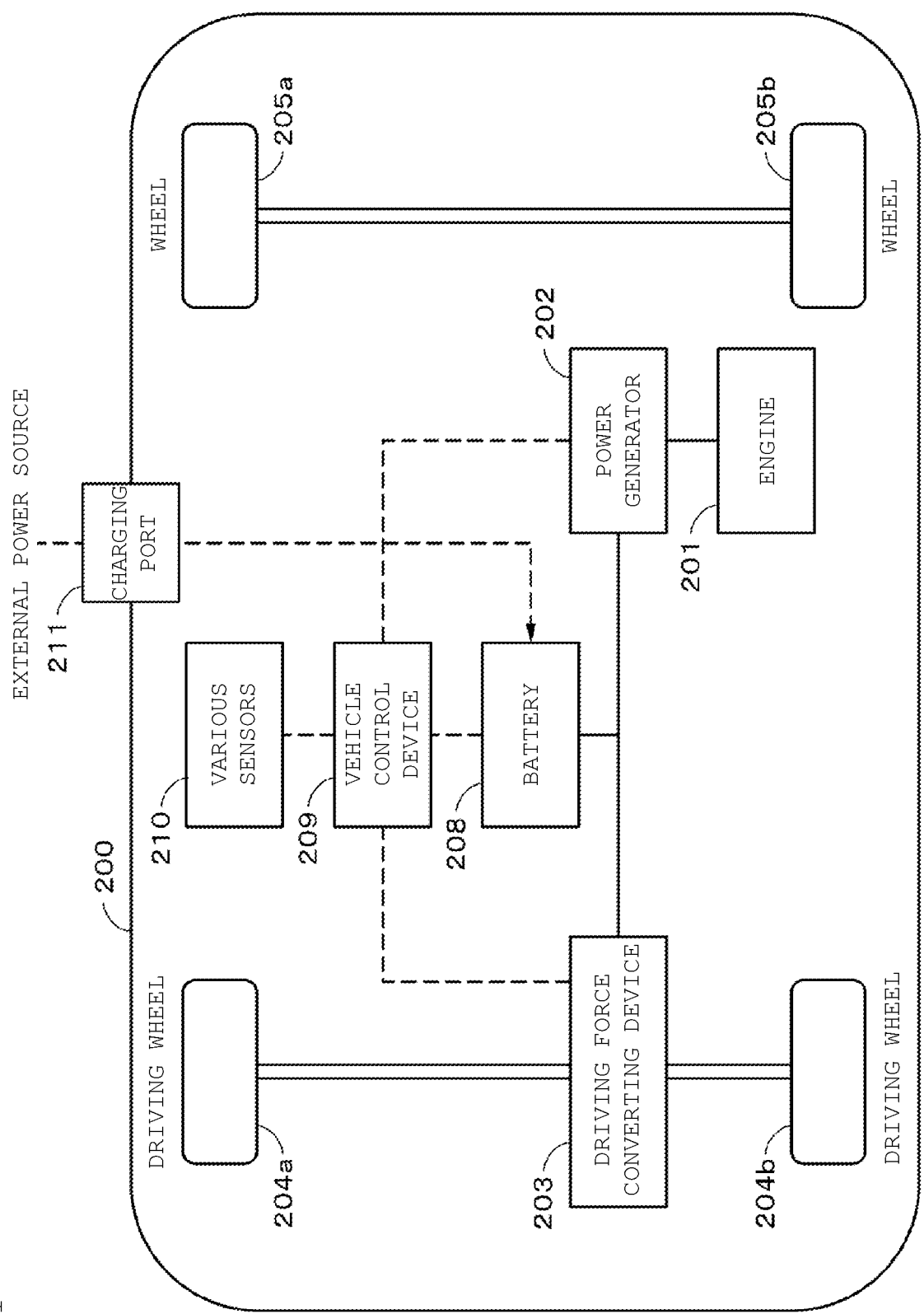
FIG. 11 is a schematic diagram schematically illustrating an example of a configuration of a hybrid vehicle adopting a series hybrid system according to an embodiment of the present technology.

An example in which the present disclosure is applied to an electric storage system for a vehicle will be described with reference to FIG. 11. FIG. 11 schematically shows an example of a configuration of a hybrid vehicle employing a series hybrid system to which the present disclosure is applied. The series hybrid system is a car that runs with an electric power driving force converting device by using electric power generated by an electric generator activated through an engine or electric power once stored in a battery.

In the hybrid vehicle 200, an engine 201, an electric generator 202, an electric power driving force converting device 203, a driving wheel 204a, a driving wheel 204b, a wheel 205a, a wheel 205b, a battery 208, a vehicle control device 209 (controller including a processor), various sensors 210, and a charging port 211 are mounted. The battery of the present disclosure described above is applied to the battery 208.

The hybrid vehicle 200 runs by using the electric power driving force converting device 203 as a power source. One example of the electric power driving force converting device 203 is a motor. The electric power driving force converting device 203 is operated by the electric power of the battery 208 and a rotational force of the electric power driving force converting device 203 is transmitted to the driving wheels 204a and 204b. By using direct current-alternate current (DC-AC) or reverse conversion (AC-DC conversion) for the necessary place, the electric power driving force converting device 203 can be applied to both an AC motor and a DC motor. The various sensors 210 control an engine rotational speed via the vehicle control device 209 and control the opening degree of a throttle valve that is not shown in the diagram (throttle opening). The various sensors 210 include a velocity sensor, an acceleration sensor, an engine rotational speed sensor, or the like.

The rotational force of the engine 201 is transmitted to the electric generator 202, and the electric power generated by the electric generator 202 through the rotational force can be accumulated in the battery 208.

When the hybrid vehicle 200 decelerates by a braking mechanism that is not shown in the diagram, resistance force at the time of deceleration is applied to the electric power driving force converting device 203 as a rotational force, and regenerative electric power generated by the electric power driving force converting device 203 by the rotational force is accumulated in the battery 208.

It is also possible that the battery 208 is connected to a power source outside the hybrid vehicle 200 to thereby receive supply of electric power from the external power source by using the charging port 211 as an input port and accumulate the received power.

Although not shown in the diagram, the hybrid vehicle 200 may include an information processing device which executes information processing relating to vehicle control based on information concerning the secondary battery. As such an information processing device, for example, there is an information processing device for displaying the battery remaining capacity based on information concerning the remaining capacity of the battery, or the like.

The above is an example of the series hybrid car which runs with a motor by using electric power generated by an electric generator activated through an engine or electric power once stored in a battery. However, the present disclosure can be effectively applied also to a parallel hybrid car which employs both outputs of engine and motor as the drive source and uses, with appropriate switching, three modes, running by only the engine, running by only the motor, and running by the engine and the motor. Furthermore, the present disclosure can be effectively applied also to a so-called electric vehicle which does not use an engine and runs by driving by only a drive motor.

Although one embodiment of the present technology has been specifically described above, the present technology is not limited to the embodiment described herein, and various modifications based on the technical idea of the present technology are possible. For example, the configurations, methods, steps, shapes, materials, numerical values and the like described in the above embodiments are merely examples, and configurations, methods, steps, shapes, materials and numerical values different from those described above may be employed as required.

The present technology is described below in further detail according to an embodiment.

(1)
A battery module including:
a battery part in which one battery cell or a plurality of battery cells are connected in series;
first and second leads respectively led out from the positive electrode and the negative electrode of the battery part;
an N-channel type first FET in which the first lead is connected to a drain and a positive output terminal is connected to a source;
a negative output terminal connected to the second lead;
a pre-discharge circuit which is inserted in parallel with a drain-source path of the first FET and raises a potential of the positive output terminal prior to the ON of the first FET when turning on the first FET at the time of discharging; and
a forced OFF circuit for forcibly turning off the first FET by short-circuiting between a gate and the source of the first FET.

(2)
The battery module according to the above (1), further including a battery monitor for monitoring a voltage and an output voltage of the battery cell of the battery part.

(3)
The battery module according to the above (1) or (2), in which the battery module has a communication terminal, and receives a control signal for controlling ON/OFF of a voltage output from the positive output terminal and the negative output terminal through the communication terminal.

(4)
The battery module according to the above (3), in which the communication terminal is of an insulation type.

(5)
The battery module according to any one of the above (1) to (4), in which the pre-discharge circuit is inserted in parallel with a drain-source path of the first FET and composed of a P-channel type second FET turned on prior to the ON of the first FET when turning on the first FET by the control signal from the control part.

(6)
The battery module according to the above (5), in which the second FET is turned off after the first FET is turned on.

(7)
The battery module according to any one of the above (1) to (6), in which the forced OFF circuit is composed of an N-channel type third FET for forcibly turning off the first FET by short-circuiting between the gate and the source of the first FET when the positive output terminal becomes lower in a voltage than the negative output terminal.

(8)
The battery module according to the above (7), in which a gate-source threshold value of the third FET is made smaller than a gate-source threshold value of the first FET.

(9)
The battery module according to any one of the above (1) to (8), further including a backflow prevention diode inserted between the source of the first FET and the source of the third FET.

(10)
The battery module according to any one of the above (1) to (9), in which the positive output terminal is connected to the input terminal of the battery monitor via a resistor, and the battery module has a diode inserted between the input terminal and the negative output terminal.

(11)
A battery device including at least two battery modules being connected in series,
in which
the battery module includes:
a battery part in which one battery cell or a plurality of battery cells are connected in series;
first and second leads respectively led out from the positive electrode and the negative electrode of the battery part;
an N-channel type first FET in which the first lead is connected to a drain and a positive output terminal is connected to a source;
a negative output terminal connected to the second lead;
a pre-discharge circuit which is inserted in parallel with a drain-source path of the first FET and raises a potential of the positive output terminal prior to the ON of the first FET when turning on the first FET at the time of discharging; and
a forced OFF circuit for forcibly turning off the first FET by short-circuiting between a gate and the source of the first FET.

(12)
The battery device according to the above (11), in which each of the two battery modules has an insulated communication terminal, and
a control signal for controlling ON/OFF of discharging of the battery module is supplied to the communication terminal by connecting the communication terminals with each other.

(13)
The battery device according to the above (11), in which the lower battery module of the two battery modules is turned on prior to the upper battery module.

(14)
An electronic device which receives electric power supply from the battery module according to the above (1) or the battery device according to the above (11).

(15)
An electric vehicle including:
the battery module according to the above (1) or the battery device according to the above (11);
a converting device that receives supply of electric power from the battery module or the battery device and converts the electric power into a driving force of a vehicle; and
a control device that performs information processing on vehicle control based on information on the battery.

(16)
An electric storage device having the battery module according to the above (1) or the battery device according to the above (11) and supplying electric power to an electronic device connected to the battery module or the battery device.

(17)
The electric storage device according to the above (16), in which
the electric storage device includes an electric power information control device which transmits and receives signals to and from another device via a network, and
charge-discharge control of the battery module or the battery device is performed based on information received by the electric power information control device.

(18)
An electric power system that receives electric power supply from the battery module according to the above (1) or the battery device according to the above (11).

(19) The electric power system according to the above (18), in which electric power is supplied to the battery module or the battery device from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery module comprising:
a battery part including one battery cell or a plurality of battery cells connected in series;
first and second leads respectively led out from a positive electrode and a negative electrode of the battery part;
a first Field Effect Transistor (FET), wherein the first FET is an N-channel type and a drain of the first FET is connected to the first lead and a source of the first FET is connected to a positive output terminal;
a negative output terminal connected to the second lead;
a pre-discharge circuit provided in parallel with a drain-source path of the first FET, wherein the pre-discharge circuit is configured to raise a potential of the positive output terminal prior to an ON state of the first FET at discharging; and
a forced OFF circuit configured to turn off the first FET by short-circuiting between a gate and the source of the first FET.

2. The battery module according to claim 1, further comprising a battery monitor configured to monitor a voltage of the battery part.

3. The battery module according to claim 1, wherein the battery module includes a communication terminal, and the battery module is configured to receive a control signal of controlling ON/OFF of a voltage output from the positive output terminal and the negative output terminal through the communication terminal.

4. The battery module according to claim 3, wherein the communication terminal is insulated.

5. The battery module according to claim 1, wherein the pre-discharge circuit includes a second FET, and wherein the second FET is a P-channel type and is configured to be turned on prior to the ON state of the first FET.

6. The battery module according to claim 5, wherein the second FET is turned off after the first FET is turned on.

7. The battery module according to claim 1, wherein the forced OFF circuit includes a third FET, and wherein the third FET is a N-channel type and is configured to turn off the first FET by short-circuiting between the gate and the source of the first FET when a voltage of the positive output terminal becomes lower than the negative output terminal.

8. The battery module according to claim 7, wherein a gate-source threshold value of the third FET is smaller than the first FET.

9. The battery module according to claim 1, further comprising a backflow prevention diode provided between the source of the first FET and a source of the third FET.

10. The battery module according to claim 1, wherein the positive output terminal is connected to the input terminal of the battery monitor through a resistor, and the battery module has a diode provided between the input terminal and the negative output terminal.

11. A battery device comprising at least two battery modules being connected in series,
wherein
at least one of the battery modules includes:
a battery part including one battery cell or a plurality of battery cells connected in series;
first and second leads respectively led out from a positive electrode and a negative electrode of the battery part;
a first Field Effect Transistor (FET), wherein the first FET is an N-channel type and a drain of the first FET is connected to the first lead and a source of the first FET is connected to a positive output terminal;
a negative output terminal connected to the second lead;
a pre-discharge circuit provided in parallel with a drain-source path of the first FET, wherein the pre-discharge circuit is configured to raise a potential of the positive output terminal prior to an ON state of the first FET at discharging; and
a forced OFF circuit configured to turn off the first FET by short-circuiting between a gate and the source of the first FET.

12. The battery device according to claim 11, wherein
each of the two battery modules has an insulated communication terminal, and
a control signal for controlling ON/OFF of discharging of the battery modules is supplied to the communication terminal by connecting the communication terminals with each other.

13. The battery device according to claim 11, wherein a first battery module of the two battery modules is turned on prior to a second battery module.

14. An electronic device configured to receive electric power supply from the battery module according to claim 1.

15. An electric vehicle comprising:
the battery module according to claim 1;
a converting device configured to receive supply of electric power from the battery module and convert the electric power into a driving force of a vehicle; and
a controller configured to perform information processing on vehicle control based on information on the battery.

16. An electric storage device comprising the battery module according to claim 1, wherein the electric storage device is configured to supply electric power to an electronic device.

17. The electric storage device according to claim 16, wherein
the electric storage device includes an electric power information control device configured to transmit and receive signals to and from another device via a network, and
charge-discharge control of the battery module is performed based on information received by the electric power information control device.

18. An electric power system configured to receive electric power supply from the battery module according to claim 1.

19. The electric power system according to claim 18, wherein electric power is supplied to the battery module from a power generation device or a power network.

* * * * *